United States Patent [19]
Ament

[11] Patent Number: 5,927,460
[45] Date of Patent: Jul. 27, 1999

[54] CLUTCH DISK WITH A DOUBLE FACING SPRING

[75] Inventor: Norbert Ament, Eltingshausen, Germany

[73] Assignee: Fichtel & Sachs AG, Schweinfurt, Germany

[21] Appl. No.: 08/847,348

[22] Filed: Apr. 24, 1997

[30] Foreign Application Priority Data

May 15, 1996 [DE] Germany .................. 196 19 683.3

[51] Int. Cl.$^6$ ........................... F16D 13/64; F16D 69/04
[52] U.S. Cl. ........................ 192/107 C; 192/52.6
[58] Field of Search ............... 192/107 C, 52.6

[56] References Cited

U.S. PATENT DOCUMENTS

| 2,448,880 | 9/1948 | Gamble | 192/107 C |
| 4,113,078 | 9/1978 | Maycock | 192/107 C |
| 4,516,672 | 5/1985 | Caray | 192/107 C |

FOREIGN PATENT DOCUMENTS

| 1 414 417 | 1/1966 | France . | |
| 2 352 211 | 12/1977 | France . | |
| 2 608 706 | 6/1988 | France . | |
| 714 060 | 11/1941 | Germany . | |
| 2 111 892 | 9/1973 | Germany . | |
| 3712647 | 11/1988 | Germany | 192/107 C |
| 592 874 | 10/1947 | United Kingdom . | |
| 1 012 990 | 12/1965 | United Kingdom . | |
| 1 235 826 | 6/1971 | United Kingdom . | |
| 1 241 756 | 8/1971 | United Kingdom . | |
| 1 465 913 | 3/1977 | United Kingdom . | |
| 2 065 799 | 7/1981 | United Kingdom . | |
| 2 242 714 | 10/1991 | United Kingdom . | |
| 2269641 | 2/1994 | United Kingdom | 192/107 C |

Primary Examiner—Richard M. Lorence
Attorney, Agent, or Firm—Cohen, Pontani, Lieberman & Pavane

[57] ABSTRACT

A clutch disk for a friction clutch, especially for internal combustion engines, with a hub, two friction disks which are arranged concentric to the hub and are connected thereto. A plurality of facing spring elements are connected with the friction disks so as to be rotationally fixed relative thereto, and are provided between the friction disks in the circumferential direction. The facing spring elements are curved in a wavy manner and nested against one another in pairs such that they exert a force on the friction disks in the axial direction. The facing spring elements which are nested against one another are designed so that their ends which are directed in the circumferential direction are located at a distance from one another in the no-load state of the clutch.

7 Claims, 3 Drawing Sheets

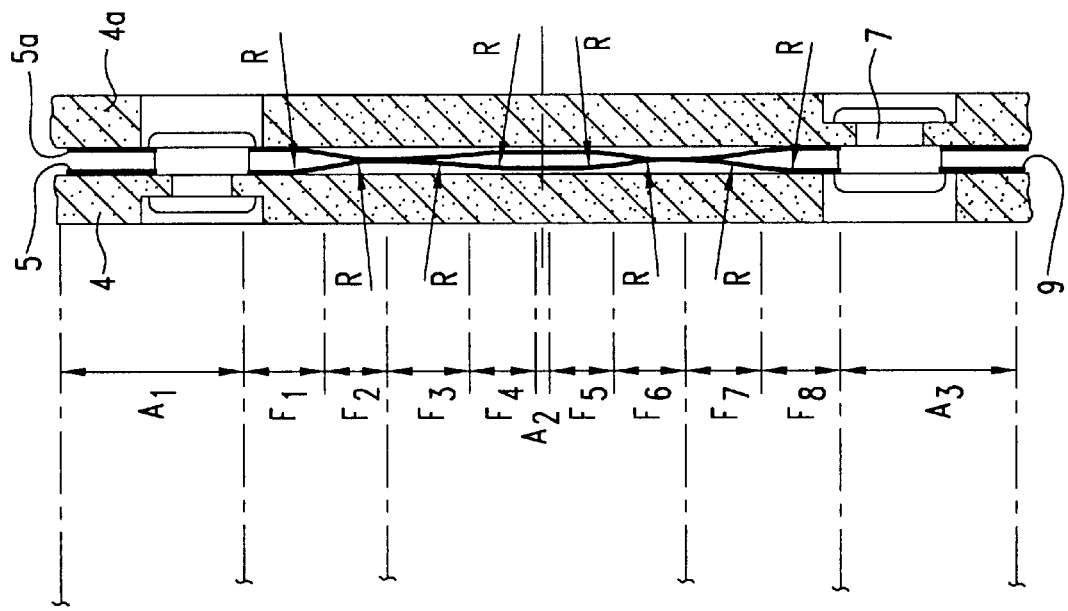
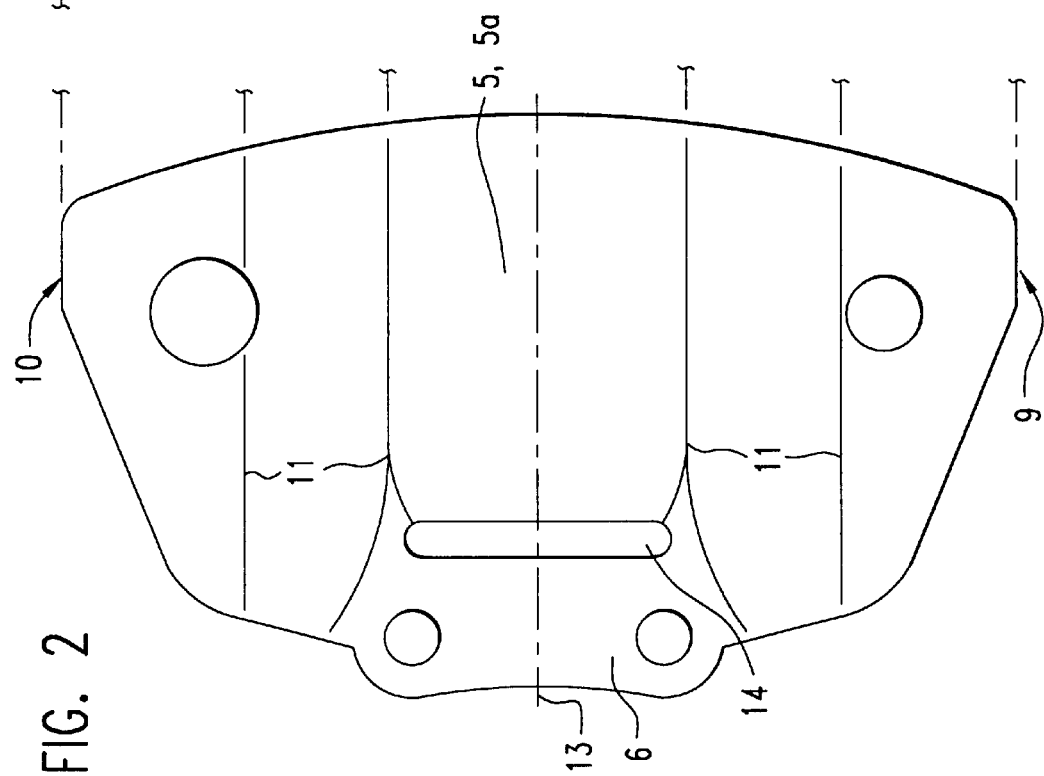

CLUTCH DISK WITH A DOUBLE FACING SPRING

BACKGROUND OF THE INVENTION

1. Field of the Invention

The invention relates to a clutch disk for a friction clutch, especially for internal combustion engines. Such a clutch disk has a hub, two friction disks connected with the hub so as to be concentric thereto, and a plurality of facing spring elements which are connected with the friction disks so as to be rotatably fixed relative to them. The spring elements are provided between the friction disks in the circumferential direction. The facing spring elements are also bent or curved in a wavy manner and nested or braced against one another in pairs so that they exert a force on the friction disks in the axial direction.

2. Discussion of the Prior Art

A clutch disk of this kind is known, for example, from German patent 21 11 892. During the process of engaging the clutch, the pressing plate of the clutch, in conjunction with the flywheel of the internal combustion engine acting as counter-pressure plate, exerts a force on the friction clutch for transmitting torque. The spring elements which are arranged between the friction disks and which, taken together, likewise form a ring, permit the axial movement of the friction disks. Consequently, the torque is transmitted from the flywheel to the pressing plate in a gradual build-up instead of a non-uniform or jerky fashion, resulting in improved start-up driving comfort. Further, vibrations can be damped so that they are not transmitted in their entirety to the power train. To allow this damping, the spring elements are designed so that a residual spring path is maintained while the clutch is engaged and the spring elements do not rest perfectly flat against the friction disks.

When not loaded, the spring elements which are arranged opposite one another abut at their ends on their circumferencial sides. Because of the wavy shape of the facing spring elements, which does not completely disappear even in the loaded state, the contact surface on the back of the facing is naturally small. Facing wear and spring relaxation or spring set can therefore not be optimal. The area pressure in the spring elements and on the back of the facing is correspondingly high. When residual springiness is deficient, squealing—a high-pitched squeaking or whistling noise - occurs and, with the increasing trend toward minimizing driving noise, is distinctly audible to the occupants of the vehicle. A further result of high area pressure is the risk of increased wear on the back of the facing and losses due to spring set. Furthermore, the contacting ends can rub against each other causing wear and noise.

The spring elements are riveted to a disk body by their feet which project inward radially over the friction facing disks. The disk bodies are fastened, in turn, to the hub. This foot must have no waviness if a secure fastening is to be possible. For this reason, the quantity of waves in the known spring elements is limited. In order to increase the height of the waves, it is known to separate the foot from the spring element by means of a slit located farther outside radially so that the spring element can also be wavy at the level of the foot, while the foot itself is flat. However, a slit of this kind in the area of transition to the foot is problematic as regards fatigue strength, since this can lead to higher stresses in the spring element. High-quality work materials must be used in order to compensate for this fatigue strength problem, a direct result of this being stricter requirements for the manufacturing tools, which increases production costs. Manufacturing problems also cannot be ruled out. Limiting or boundary designs would result in a drop in function in the facing spring characteristic.

SUMMARY OF THE INVENTION

In view of these problems, it is an object of the present invention to provide an improved clutch disk in which the contact surface of the spring elements is to be increased on the back of the facing in the loaded state, thus minimizing facing wear and spring set behavior. The variance in possible spring system characteristics should not limited in so doing.

These aims are met in that the facing spring elements which are braced against one another are designed so that their ends which are directed in the circumferential direction are at a distance from one another in the no-load state of the clutch.

As a result of this construction, the spring ends also contact the back of the facing with their outer end. This reduces area pressure and creates another spring region in the same way as would be realized by means of an additional wave. As a result of the lower area pressure, the spring elements do not cut into the facing to such an extent and wear is reduced. Spring system losses and spring set losses brought about by the spring elements cutting into the back of the facing are prevented. Since the residual springiness of the facing springs is maintained to a sufficient extent by this reduction in wear, the risk of squealing is reduced. Because of the lower area pressure, it is now also possible to realize clutch disks with narrow facing rings. Increasing the quantity of springing regions has the advantage that more progressive characteristic curves can be realized with the same material thickness.

Since the facing spring elements no longer have sharp edge contact or sharp-edged line contact in their end regions, fatigue strength is increased. Only blunt surface contact still occurs.

The curved shape of the facing spring elements preferably extends in the shape of a cosine as seen in cross section. Regular spring regions are realized in this way.

The facing spring elements are preferably flat in the regions of contract with the friction disks so that the contact surface is increased.

In particular, the curving lines of the facing spring elements preferably extend at an angle relative to one another so as to diverge from a radial line. As a result of this step, the facing spring elements can be curved so that no curving lines extend through the foot. The problem of the transition of a third curving wave in the foot region is accordingly eliminated. The fatigue strength is substantially increased and existing manufacturing problems are eliminated. Compared to known facing spring elements, the quantity of springing regions located between the facing rivet fastenings of the individual spring elements is reduced. In critical designs in particular, this step can lead to increased fatigue strength of the connection between the facing, the facing spring element, and the facing rivet, since these springing regions are subject to a circumferential elongation/length change under load until flat contact is made.

In another embodiment of the invention, the curving lines of the facing spring elements can also run parallel to one another. The curving waves can also vary in height. Varying the height of the peak of the wave provides a very simple way to change the spring characteristic of the clutch disk. The characteristic is flatter at first and then rises when the waves of lesser height make contact.

For the purpose of reducing the structural component parts of the clutch disk, it is possible for the facing spring elements on one side in each instance to be connected with one another in their radial inner region (foot) so as to form a closed annular foot. As a result of this construction, only two facing spring rings are braced against one another during assembly.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2 shows a plan view of a facing spring element;

FIG. 3 shows a section along the line III—III in FIG. 1 with a facing spring element according to FIG. 2;

DETAILED DESCRIPTION OF THE PREFERRED EMBODIMENTS

Figure 1:
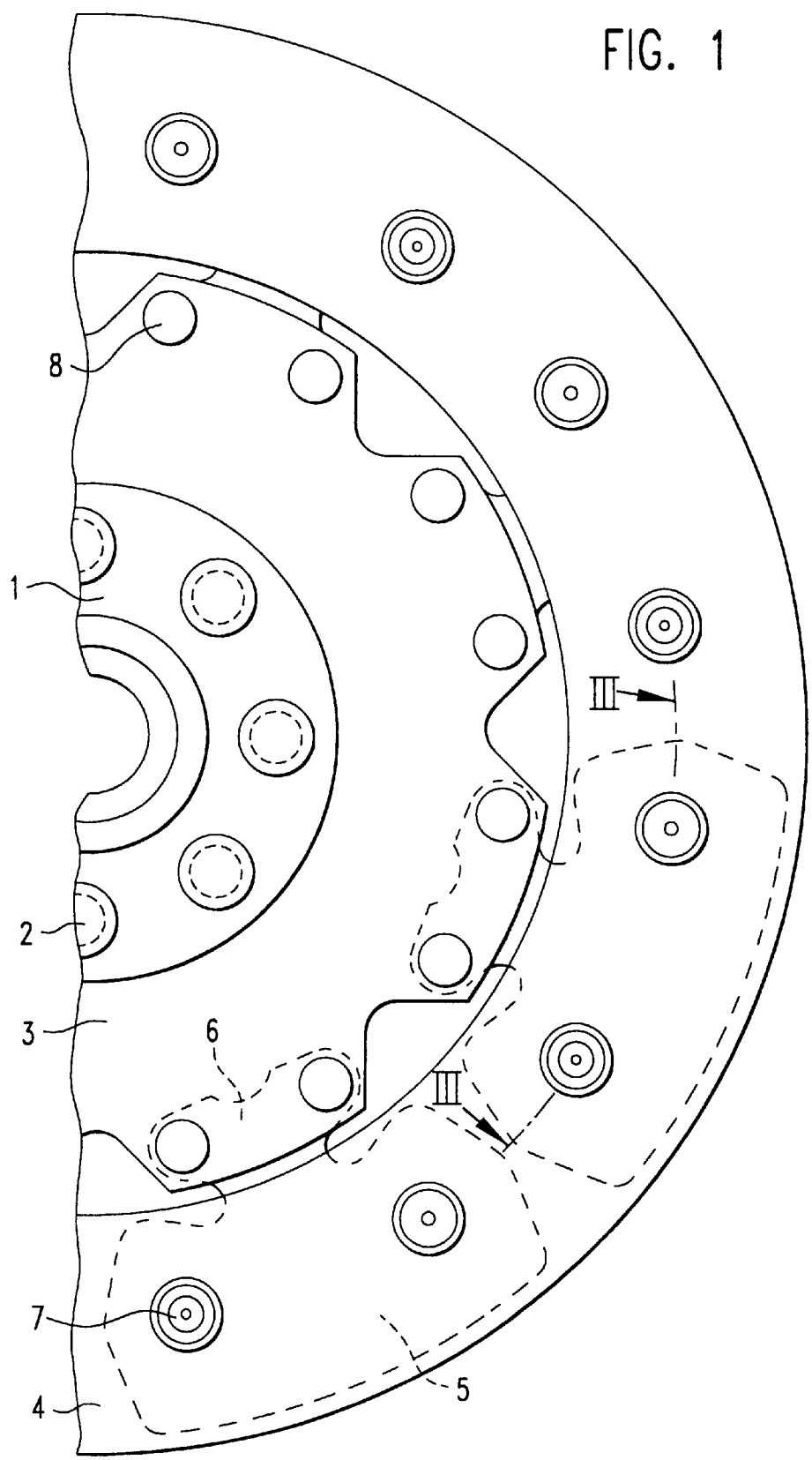
FIG. 1 shows a partial view of a clutch disk pursuant to the present invention.

FIG. 1 shows the basic construction of the clutch disk according to the invention. The hub 1 is fixedly connected with a disk body 3 by rivets 2. The inner diameter of the friction facings 4 is greater than the outer diameter of the disk body 3. A plurality of facing spring elements 5 are arranged so as to be distributed around the circumference between the friction facing rings 4, 4a. The facing spring elements 5 are connected with the friction facings 4, 4a via fasteners 7, e.g., rivets, and are located opposite one another in pairs between the friction facing rings 4, 4a. Each facing spring element 5, 5a is rigidly connected with the disk body 3 by a foot 6. The connection is preferably made by rivets 8.

The spring elements 5, 5a are curved in the shape of a cosine and are braced against one another in pairs. As is shown in FIG. 3, the curving lines are so selected that the end regions 9, 10 oriented in the circumferential direction are located at a distance from one another in the unloaded state of the clutch. The waves 11 extend parallel to the radial center axis 13. The spring element 5 in FIG. 2 is provided with a slit 14 which interrupts the curve in the region of the foot 6 so that the foot 6 connecting the facing spring element 5, 5a with the disk body 3 rests flat against the disk body 3. Three contact regions $A_1$, $A_2$, $A_3$ are provided between the facing spring elements 5, 5a and the friction facing rings 4, 4a. Every four spring regions $F_1$, $F_2$, ... $F_7$, $F_8$ are symmetrical to the center axis 13.

Figure 4:
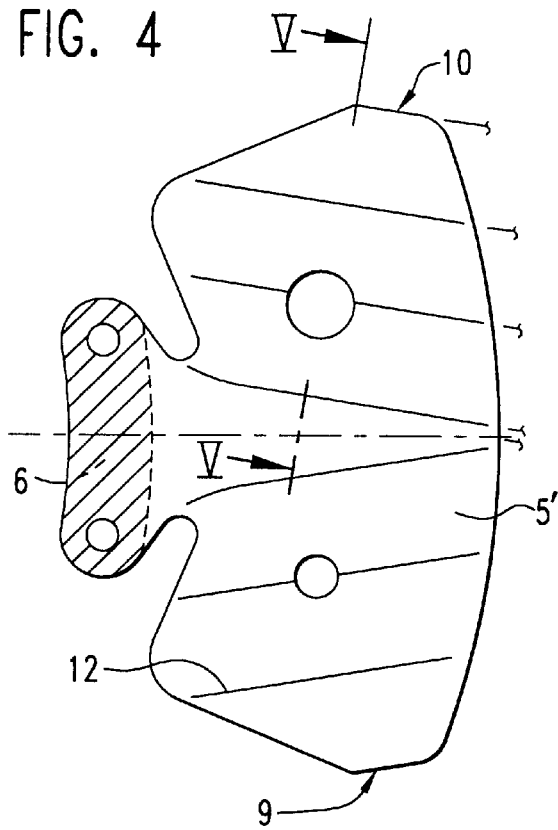
FIG. 4 shows a plan view of another facing spring element.
Figure 5:
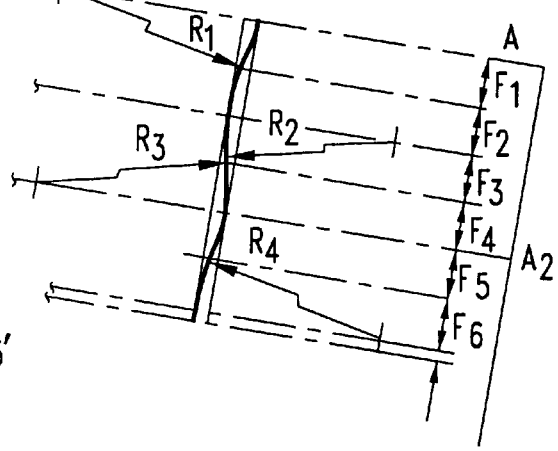
FIG. 5 is an upper partial view in section along the line V—V in FIG. 4.
Figure 6:
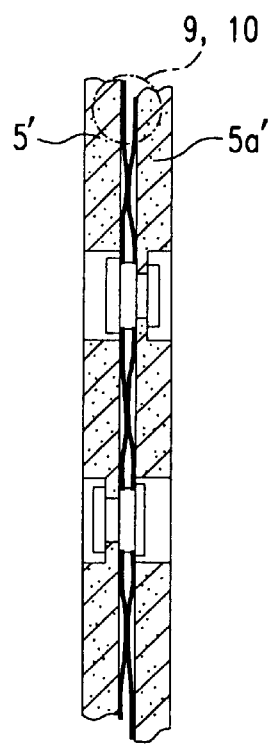
FIG. 6 shows a section along the line III—III in FIG. 1 with a spring element from FIG. 4.

FIG. 4 shows another embodiment of a facing spring element 5'. In contrast to the embodiment described previously, here the waves or curving lines 12 of the upper and lower halves of the facing spring element (as seen in FIG. 4) extend at an angle to one another and deviate from a radial line. A total of twelve spring regions $F_1$, $F_2$, ... can be realized by means of this design as will be seen from FIG. 5. FIG. 5 shows only the upper half of the facing spring element 5' which continues in a symmetrical manner relative to the center axis 13, so that only six spring regions $F_1$, ... $F_6$ are shown. As will be seen, the latter continue on symmetrically. At the same time, a fourth contact region $A_1$ is realized in this construction. In this embodiment, the first wave peak lies before the riveting location (compare FIG. 6), resulting in the increased elevation of springing regions $F_i$ and contact region $A_i$ (i=1, 2, ...). The spring elements 5', 5a' are identically constructed and are braced against one another at a rotation of 180°. $R_1$–$R_4$ indicate the respective radii of the waves.

The invention is not limited by the embodiments described above which are presented as examples only but can be modified in various ways within the scope of protection defined by the appended patent claims.

I claim:

1. A clutch disk for a friction clutch, comprising: a hub; two friction disks connected to the hub so as to be concentric thereto; and a plurality of facing spring elements connected with the friction disks so as to be rotatably fixed relative thereto, the facing spring elements being provided between the friction disks in a circumferential direction, the facing spring elements being curved in a wavy manner and nested against one another in pairs so that the spring elements exert a force on the friction disks in an axial direction of the hub, the nested facing spring elements being configured to have ends which are directed in the circumferential direction and are located at a distance from one another in a no-load state of the clutch, the facing spring elements being configured so that the ends rest plane parallel against the friction disk in the no-load state.

2. A clutch disk according to claim 1, wherein the facing spring elements are configured to have curving lines that extend at an angle relative to one another so as to diverge from a radial line.

3. A clutch disk according to claim 1, wherein the facing spring elements are configured to have curving lines that run parallel to one another.

4. A clutch disk according to claim 1, wherein the facing spring elements are configured to be flat in regions that contact with the friction disks.

5. A clutch disk according to claim 1, wherein the facing spring elements are configured to have waves of varying height.

6. A clutch disk according to claim 1, wherein the facing spring elements are connected with one another in a radial inner region.

7. A clutch disk according to claim 1, wherein at least two of the facing spring elements are connected with one another in a radial inner region.

* * * * *